(12) United States Patent
Xing et al.

(10) Patent No.: US 12,386,160 B2
(45) Date of Patent: Aug. 12, 2025

(54) ZOOM LENS

(71) Applicant: ZHEJIANG DAHUA TECHNOLOGY CO., LTD., Zhejiang (CN)

(72) Inventors: Yuanyuan Xing, Hangzhou (CN); Kai Liu, Hangzhou (CN); Hongxing Ding, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 224 days.

(21) Appl. No.: 18/299,077

(22) Filed: Apr. 12, 2023

(65) Prior Publication Data

US 2023/0244068 A1  Aug. 3, 2023

Related U.S. Application Data

(63) Continuation of application No. PCT/CN2021/123746, filed on Oct. 14, 2021.

(30) Foreign Application Priority Data

Jul. 12, 2021 (CN) .......................... 202110785932.1

(51) Int. Cl.
*G02B 15/14* (2006.01)
*G02B 13/00* (2006.01)
*G02B 13/02* (2006.01)
*G02B 27/00* (2006.01)

(52) U.S. Cl.
CPC ......... *G02B 15/145* (2019.08); *G02B 13/009* (2013.01); *G02B 13/02* (2013.01); *G02B 27/0025* (2013.01)

(58) Field of Classification Search
CPC .... G02B 15/145109; G02B 15/145113; G02B 15/145125; G02B 15/145129; G02B 15/45509; G02B 15/145525; G02B 15/145529
USPC .................................................. 359/676–685
See application file for complete search history.

(56) References Cited

U.S. PATENT DOCUMENTS

| | | |
|---|---|---|
| 2005/0174654 A1 | 8/2005 | Kawasaki |
| 2006/0274426 A1 | 12/2006 | Sueyoshi |
| 2007/0229967 A1 | 10/2007 | Nagahara |
| 2008/0212184 A1 | 9/2008 | Ohtake |
| 2011/0149119 A1 | 6/2011 | Matsui |

(Continued)

FOREIGN PATENT DOCUMENTS

| | | |
|---|---|---|
| CN | 203811886 U | 9/2014 |
| CN | 106154519 B | 10/2018 |

(Continued)

OTHER PUBLICATIONS

International Search Report in PCT/CN2021/123746 mailed on Apr. 13, 2022, 5 pages.

(Continued)

*Primary Examiner* — Darryl J Collins
(74) *Attorney, Agent, or Firm* — Metis IP LLC

(57) ABSTRACT

The present disclosure relates to zoom lenses. A zoom lens may include in order from an object side to an image side: a first lens group; a second lens group; a third lens group; a fourth lens group; and a fifth lens group; wherein the zoom lens satisfies certain conditions.

18 Claims, 6 Drawing Sheets

(56) References Cited

U.S. PATENT DOCUMENTS

| | | |
|---|---|---|
| 2012/0099208 A1 | 4/2012 | Peng et al. |
| 2012/0262608 A1* | 10/2012 | Nakamura ..... G02B 15/145125 359/683 |
| 2013/0222922 A1 | 8/2013 | Atsuumi et al. |
| 2014/0204252 A1* | 7/2014 | Yoshimi ............ G02B 15/1461 359/683 |
| 2015/0241673 A1 | 8/2015 | Nagatoshi |
| 2015/0260969 A1 | 9/2015 | Sudoh |
| 2016/0048007 A1* | 2/2016 | Takada .......... G02B 15/145109 359/684 |
| 2016/0124199 A1 | 5/2016 | Sanjo et al. |
| 2017/0115472 A1* | 4/2017 | Obama .......... G02B 15/144113 |
| 2018/0074301 A1* | 3/2018 | Suzuki .......... G02B 15/145125 |
| 2018/0267279 A1 | 9/2018 | Fujikura et al. |
| 2020/0310085 A1 | 10/2020 | Tanaka |
| 2021/0109330 A1* | 4/2021 | Hori ..................... G02B 15/173 |
| 2022/0082806 A1 | 3/2022 | Liu et al. |
| 2022/0137379 A1* | 5/2022 | Hori ............... G02B 15/145125 359/687 |
| 2022/0244488 A1* | 8/2022 | Sakamoto ...... G02B 15/144109 |
| 2022/0244513 A1* | 8/2022 | Goto .............. G02B 15/145117 |

FOREIGN PATENT DOCUMENTS

| | | |
|---|---|---|
| CN | 110187484 A | 8/2019 |
| CN | 110673315 A | 1/2020 |
| CN | 111427139 A | 7/2020 |
| CN | 111781717 A | 10/2020 |
| CN | 111830677 A | 10/2020 |
| CN | 111999872 A | 11/2020 |
| WO | 2016121927 A1 | 8/2016 |

OTHER PUBLICATIONS

Written Opinion in PCT/CN2021/123746 mailed on Apr. 13, 2022, 5 pages.
3 First Office Action in Chinese Application No. 202110785932.1 mailed on Mar. 9, 2022, 14 pages.
Partial Supplementary European Search Report in European Application No. 21949918.3 mailed on Feb. 13, 2024, 12 pages.

* cited by examiner

ZOOM LENS

CROSS-REFERENCE TO RELATED APPLICATIONS

This application is a continuation of International Application No. PCT/CN2021/123746, filed on Oct. 14, 2021, which claims priority of Chinese Application No. 202110785932.1, filed on Jul. 12, 2021, the contents of which are incorporated herein in its entirety by reference.

TECHNICAL FIELD

The present disclosure generally relates to optical imaging technology, and more particularly, to zoom lenses.

BACKGROUND

With the developments of video surveillance and surveillance cameras, zoom lenses become more and more popular due to superior adaptability to complicated scenarios with their variable focal lengths. Existing zoom lenses usually have small image planes, low resolutions, poor imaging qualities, or large sizes. Thus, it is desirable to provide zoom lenses with large image planes, high resolutions, high imaging qualities, and small sizes.

SUMMARY

An aspect of the present disclosure introduces a zoom lens including, in order from an object side to an image side: a first lens group; a second lens group; a third lens group; a fourth lens group; and a fifth lens group; wherein the zoom lens satisfies the following conditions:

$$-5.6 \leq \frac{f_2}{f_w} \times \tan(FOV_w) \leq -2.1, \ 0.05 \leq \frac{f_4}{f_T} \times \tan(FOV_T) \leq 0.2,$$

$$3.9 \leq \frac{\sqrt{f_w \times f_T}}{TTL} \times BFL \leq 5.2, \text{ and } \frac{BFL}{TL} \leq 0.35,$$

wherein $f_2$ denotes a focal length of the second lens group, $f_4$ denotes a focal length of the fourth lens group, $f_w$ denotes a focal length of the zoom lens at a wide angle end, $FOV_W$ denotes a field of view of the zoom lens at the wide angle end, $f_T$ denotes a focal length of the zoom lens at a telephoto end, $FOV_T$ denotes a field of view of the zoom lens at the telephoto end, TTL denotes a total track length of the zoom lens, BFL denotes a back focal length of the zoom lens, and TL denotes a total length of the zoom lens.

In some embodiments, the first lens group includes, in order from the object side to the image side: a first lens having a negative focal power; a second lens having a positive focal power; and a third lens having a positive focal power lens.

In some embodiments, the first lens is cemented with the second lens to form a cemented doublet.

In some embodiments, the first lens includes a meniscus lens, and a surface of the meniscus lens facing the object side is convex.

In some embodiments, the second lens includes a biconvex lens, and a radius of curvature of a surface of the first lens facing the image side equals a radius of curvature of a surface of the second lens facing the object side.

In some embodiments, the third lens includes a meniscus lens, and a surface of the meniscus lens facing the object side is convex.

In some embodiments, the second lens group includes, in order from the object side to the image side: a fourth lens having a negative focal power; a fifth lens having a negative focal power; and a sixth lens having a positive focal power.

In some embodiments, a radius of curvature R8 of a surface of the fourth lens facing the image side and a radius of curvature R9 of a surface of the fifth lens facing the object side satisfies:

$$\frac{(R8 - R9)}{(R8 + R9)} \leq -2.3.$$

In some embodiments, the fourth lens includes a meniscus lens, and a surface of the meniscus lens facing the object side is convex.

In some embodiments, the fifth lens includes a biconcave lens.

In some embodiments, the sixth lens includes a meniscus lens, and a surface of the meniscus lens facing the object side is convex.

In some embodiments, the third lens group includes, in order from the object side to the image side: a seventh lens having a negative focal power; an eighth lens having a positive focal power; a ninth lens having a positive focal power; and a tenth lens having a negative focal power lens.

In some embodiments, the seventh lens is cemented with the eighth lens to form a cemented doublet.

In some embodiments, the ninth lens is cemented with the tenth lens to form a cemented doublet.

In some embodiments, the seventh lens includes a biconcave lens.

In some embodiments, the eighth lens includes a biconvex lens, and a radius of curvature of a surface of the seventh lens facing the image side equals a radius of curvature of a surface of the eighth lens facing the object side.

In some embodiments, the ninth lens includes a biconvex lens.

In some embodiments, the tenth lens includes a biconcave lens, and a radius of curvature of a surface of the ninth lens facing the image side equals a radius of curvature of a surface of the tenth lens facing the object side.

In some embodiments, the fourth lens group includes, in order from the object side to the image side: an eleventh lens having a positive focal power; a twelfth lens having a positive focal power; a thirteenth lens having a negative focal power; and a fourteenth lens having a positive focal power.

In some embodiments, the twelfth lens is cemented with the thirteenth lens to form a cemented doublet.

In some embodiments, the eleventh lens includes a biconvex lens, and the biconvex lens is an aspherical lens.

In some embodiments, the twelfth lens includes a biconvex lens.

In some embodiments, the thirteenth lens includes a biconcave lens, wherein a radius of curvature of a surface of the twelfth lens facing the image side equals a radius of curvature of a surface of the thirteenth lens facing the object side.

In some embodiments, the fourteenth lens includes a biconvex lens, and the biconvex lens is an aspherical lens.

In some embodiments, the fifth lens group includes, in order from the object side to the image side: a fifteenth lens having a negative focal power, and a sixteenth lens having a positive focal power.

In some embodiments, the fifteenth lens includes a meniscus lens, and a surface of the meniscus lens facing the object side is convex.

In some embodiments, the sixteenth lens includes a meniscus lens, and a surface of the meniscus lens facing the object side is convex.

In some embodiments, the zoom lens further includes an aperture stop between the second lens group and the third lens group.

In some embodiments, the zoom lens further includes an optical filter between the fifth lens group and an image plane of the zoom lens.

In some embodiments, the zoom lens further includes an optical splitter between the fifth lens group and the optical filter.

In some embodiments, the optical splitter includes two prisms, a composition plane of the two prisms includes a film layer configured to splitting light, and the zoom lens includes a filter and an image plane corresponding to a light outlet side of each prism of the two prisms.

According to another aspect of the present disclosure introduces a zoom lens including, in order from an object side to an image side: a first lens group; a second lens group; a third lens group; a fourth lens group including two aspherical lenses; and a fifth lens group.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
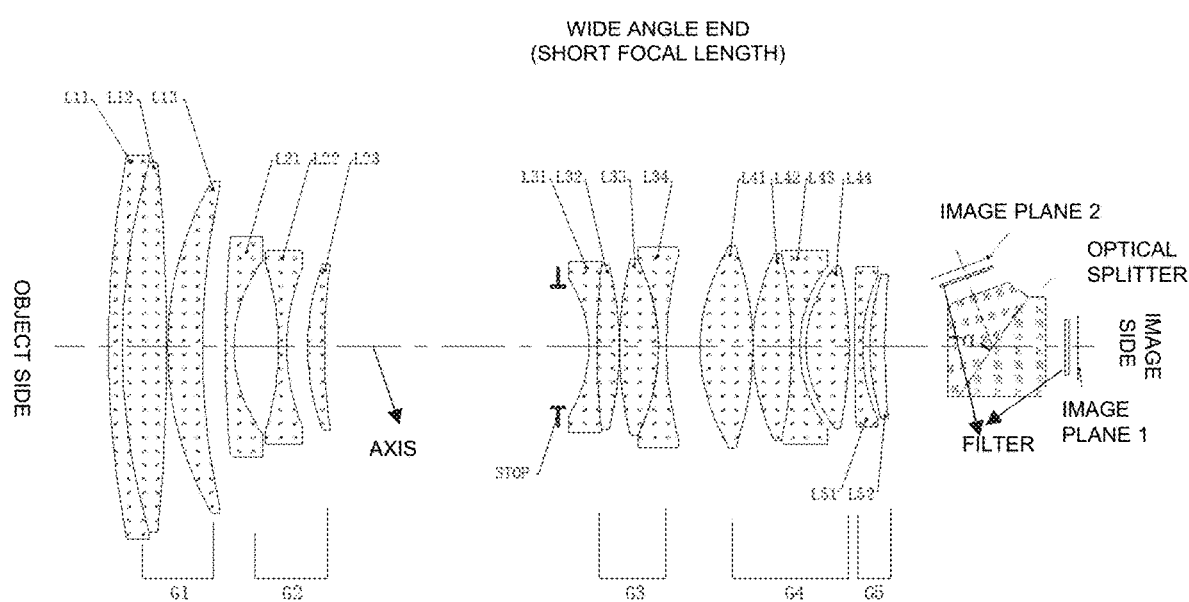
FIG. 1 illustrates an exemplary zoom lens at a wide angle end (short focal length) according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

An aspect of the present disclosure relates to zoom lenses with large image planes, high resolutions, high imaging qualities, and small sizes. To this end, the zoom lenses may include a plurality of lenses each of which has a particular shape and structure, and a certain refractive power. The plurality of lenses may be arranged in a certain order from an object side to an image side. The zoom lenses may include, in order from an object side to an image side a first lens group, a second lens group, a third lens group, a fourth lens group, and a fifth lens group. In some embodiments, the zoom lens may use two aspherical lenses in the fourth lens group and suitable optical materials to make the structure, parameters (e.g., the refractive index, the Abbe number, etc.) of the zoom lenses satisfy certain imaging conditions. In this way, the performances of the zoom lenses may be calibrated to realize large image planes, high resolutions, high imaging qualities, and small sizes.

Figure 2:
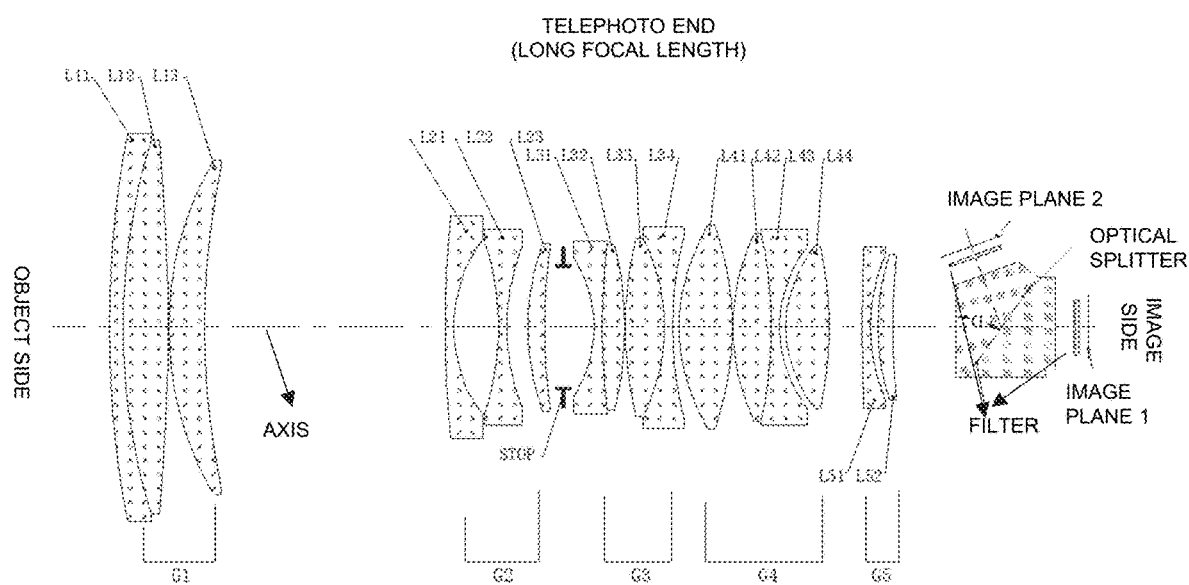
FIG. 2 illustrates an exemplary zoom lens at a telephoto end (long focal length) according to some embodiments of the present disclosure.

FIG. 1 illustrates an exemplary zoom lens at a wide angle end (short focal length) according to some embodiments of the present disclosure. FIG. 2 illustrates an exemplary zoom lens at a telephoto end (long focal length) according to some embodiments of the present disclosure. In some embodiments, the zoom lens may include an object side and an image side at two ends of the zoom lens, respectively. For example, as shown in FIGS. 1 and 2, in order from the object side to the image side, the zoom lens may include a first lens group G1, a second lens group G2, an aperture stop, an aperture stop, a third lens group G3, a fourth lens group G4, a fifth lens group G5, an optical filter, and an image plane. In some embodiments, the second lens group G2 may be movable between the first lens group G1 and the third lens group G3 along an axis of the zoom lens. As another example, the fourth lens group G4 may be movable between the third lens group G3 and the fifth lens group G5 along the axis of the zoom lens. The zoom lens may zoom in or zoom out according to the movement of the second lens group G2 and/or the fourth lens group G4.

In some embodiments, the zoom lens may satisfy the following four conditions (1)-(4):

$$-5.6 \le \frac{f_2}{f_w} \times \tan(FOV_w) \le -2.1, \quad (1)$$

$$0.05 \le \frac{f_4}{f_T} \times \tan(FOV_T) \le 0.2, \quad (2)$$

$$3.9 \le \frac{\sqrt{f_w \times f_T}}{TTL} \times BFL \le 5.2, \quad (3)$$

$$\frac{BFL}{TL} \le 0.35, \quad (4)$$

where $f_2$ denotes a focal length of the second lens group G2, $f_4$ denotes a focal length of the fourth lens group G4, $f_w$ denotes a focal length of the zoom lens at a wide angle end, $FOV_W$ denotes a field of view of the zoom lens at the wide angle end, $f_T$ denotes a focal length of the zoom lens at a telephoto end, $FOV_T$ denotes a field of view of the zoom lens at the telephoto end, TTL denotes a total track length of the zoom lens, BFL denotes a back focal length of the zoom lens, and TL denotes a total length of the zoom lens.

In some embodiments, the first lens group G1 may include a plurality of lenses. For example, in order from the object side to the image side, the first lens group G1 may include a first lens L11 having a negative refractive power, a second lens L12 having a positive focal power, and a third lens L13 having a positive focal power lens.

In some embodiments, as shown in FIGS. 1 and 2, the first lens L11 may include a meniscus lens. A surface of the meniscus lens facing the object side may be convex. In some embodiments, the second lens L12 may include a biconvex lens. In some embodiments, the third lens L13 may include a meniscus lens. A surface of the meniscus lens facing the object side may be convex.

In some embodiments, a parameter (e.g., a refractive index, an Abbe number, a focal length, a radius of curvature of a surface, etc.) of each lens of the first lens group G1 may satisfy a certain condition. For example, an Abbe number $Vd_{11}$ of the first lens L11 may satisfy: $Vd_{11} \le 21$. As another example, a focal length $f_{12}$ of the second lens L12 may satisfy: $f_{12} \le 125$. As still another example, a radius of curvature of a surface of the first lens L11 facing the image side may equal a radius of curvature of a surface of the second lens L12 facing the object side.

In some embodiments, the first lens L11 may be cemented with the second lens L12 to form a cemented doublet. In this way, the lenses of the first lens group G1 (or the zoom lens) may be arranged compactly, thereby obtaining a zoom lens with a small size.

In some embodiments, the second lens group G2 may include a plurality of lenses. For example, in order from the object side to the image side, the second lens group G2 may include a fourth lens L21 having a negative focal power, a fifth lens L22 having a negative focal power, and a sixth lens L23 having a positive focal power.

In some embodiments, as shown in FIGS. 1 and 2, the fourth lens L21 may include a meniscus lens. A surface of the meniscus lens facing the object side may be convex. In some embodiments, the fifth lens L22 may include a biconcave lens. In some embodiments, the sixth lens L23 may include a meniscus lens. A surface of the meniscus lens facing the object side may be convex.

In some embodiments, a parameter (e.g., a refractive index, an Abbe number, a focal length, a radius of curvature of a surface, etc.) of each lens of the second lens group G2 may satisfy a certain condition. For example, a refractive index $Nd_{21}$ of the fourth lens L21 may satisfy: $Nd_{21} \le 1.75$. As another example, a focal length $f_{22}$ of the fifth lens L22 may satisfy: $f_{22} \le -19$. As still another example, an Abbe number $Vd_{23}$ of the sixth lens L23 may satisfy: $Vd_{23} \le 67$. As still another example, a radius of curvature R8 of a surface of the fourth lens L21 facing the image side and a radius of curvature R9 of a surface of the fifth lens L22 facing the object side may satisfy:

$$\frac{(R8 - R9)}{(R8 + R9)} \le -2.3.$$

The fourth lens L21 and the fifth lens L22 may be fabricated according to the satisfied condition regarding the radius of curvatures.

In some embodiments, a diameter of the aperture stop may affect a depth of field, a f-number (e.g., a number that shows a relationship between a focal length of a zoom lens and its diameter), etc., of the zoom lens. For example, a smaller aperture stop may produce a longer depth of field and/or a greater f number of a zoom lens. In some embodiments, the diameter of the aperture stop may be a fixed value. In some embodiments, the diameter of the aperture stop may be adjustable according to different requirements of the depth of field and/or the f number.

In some embodiments, the third lens group G3 may include a plurality of lenses. For example, in order from the object side to the image side, the third lens group G3 may include a seventh lens L31 having a negative focal power, an eighth lens L32 having a positive focal power, a ninth lens L33 having a positive focal power, and a tenth lens L34 having a negative focal power lens.

In some embodiments, as shown in FIGS. 1 and 2, the seventh lens L31 may include a biconcave lens. In some embodiments, the eighth lens L32 may include a biconvex lens. In some embodiments, the ninth lens L33 may include a biconvex lens. In some embodiments, the tenth lens L34 may include a biconcave lens.

In some embodiments, a parameter (e.g., a refractive index, an Abbe number, a focal length, a radius of curvature of a surface, etc.) of each lens of the third lens group G3 may satisfy a certain condition. For example, a radius of curvature of a surface of the ninth lens L33 facing the image side may equal a radius of curvature of a surface of the tenth lens L34 facing the object side. As another example, a radius of curvature of a surface of the seventh lens L31 facing the image side may equal a radius of curvature of a surface of the eighth lens L32 facing the object side.

In some embodiments, two neighboring lenses in the third lens group G3 may be cemented with each other to form a cemented doublet. For example, the seventh lens L31 may be cemented with the eighth lens L32 to form a cemented doublet. As another example, the ninth lens L33 may be cemented with the tenth lens L34 to form a cemented doublet. In this way, the lenses of the third lens group G3 (or the zoom lens) may be arranged compactly, thereby obtaining a zoom lens with a small size.

In some embodiments, the fourth lens group G4 may include a plurality of lenses. For example, the fourth lens group G4 may include two aspherical lenses. The two aspherical lenses may be arranged at the rear of the zoom lens, and small sizes of the two aspherical lenses may save cost for producing the zoom lens. As another example, in order from the object side to the image side, the fourth lens group G4 may include an eleventh lens L41 having a positive focal power, a twelfth lens L42 having a positive focal power, a thirteenth lens L43 having a negative focal power, and a fourteenth lens L44 having a positive focal power.

In some embodiments, as shown in FIGS. 1 and 2, the eleventh lens L41 includes a biconvex lens. The biconvex lens of the eleventh lens L41 may be an aspherical lens. In some embodiments, the twelfth lens L42 may include a biconvex lens. In some embodiments, the thirteenth lens L43 may include a biconcave lens. In some embodiments, the fourteenth lens L44 may include a biconvex lens. The biconvex lens of the fourteenth lens L44 may be an aspherical lens.

In some embodiments, a parameter (e.g., a refractive index, an Abbe number, a focal length, a radius of curvature of a surface, etc.) of each lens of the fourth lens group G4 may satisfy a certain condition. For example, a radius of curvature of a surface of the twelfth lens L42 facing the image side may equal a radius of curvature of a surface of the thirteenth lens L43 facing the object side. As another example, a refractive index $Nd_{41}$ of the eleventh lens L41 may satisfy: $Nd_{41} \leq 1.61$. As another example, a focal length $f_{42}$ of the twelfth lens L42 may satisfy: $f_{42} \leq 42$. As still another example, a refractive index $Nd_{43}$ of the thirteenth lens L43 may satisfy: $Nd_{43} \leq 1.75$.

In some embodiments, two neighboring lenses in the fourth lens group G4 may be cemented with each other to form a cemented doublet. For example, twelfth lens L42 may be cemented with the thirteenth lens L43 to form a cemented doublet. In this way, the lenses of the fourth lens group G4 (or the zoom lens) may be arranged compactly, thereby obtaining a zoom lens with a small size.

In some embodiments, the fifth lens group G5 may include a plurality of lenses. For example, in order from the object side to the image side, the fifth lens group G5 may include a fifteenth lens L51 having a negative focal power and a sixteenth lens L52 having a positive focal power.

In some embodiments, as shown in FIGS. 1 and 2, the fifteenth lens L51 may include a meniscus lens. A surface of the meniscus lens facing the object side may be convex. In some embodiments, the sixteenth lens L52 may include a meniscus lens. A surface of the meniscus lens facing the object side may be convex.

In some embodiments, a parameter (e.g., a refractive index, an Abbe number, a focal length, a radius of curvature of a surface, etc.) of each lens of the fifth lens group G5 may satisfy a certain condition. For example, an Abbe number $Vd_{51}$ of the fifteenth lens L51 may satisfy: $Vd_{51} \leq 31$. As another example, a refractive index $Nd_{52}$ of the sixteenth lens L52 may satisfy: $Nd_{52} \geq 1.86$.

In some embodiments, as shown in FIGS. 1 and 2, the zoom lens may further include an optical splitter between the fifth lens group G5 and the optical filter. The optical splitter may be configured to split a beam of light into two part. For example, as shown in FIGS. 1 and 2, the optical splitter may include two prisms. A composition plane of the two prisms may include a film layer configured to splitting beam of light into two part. The zoom lens may further include a filter and an image plane corresponding to a light outlet side of each prism of the two prisms.

In some embodiments, at least one of the five lens groups of the zoom lens may be movable to change the focal lengths of the zoom lens. For example, the first lens group G1, the third lens group G3, and the fifth lens group G5 may be fixed, and the second lens group G2 and the fourth lens group G4 may be movable. For example, to change focal lengths of the zoom lens, the second lens group G2 may be movable between the first lens group G1 and the third lens group G3 along the axis of the zoom lens. As another example, the fourth lens group G4 may be movable between the third lens group G3 and the fifth lens group G5 along the axis of the zoom lens. In some embodiments, both the second lens group G2 and the fourth lens group G4 may be moved along the axis of the zoom lens to change the focal length of the zoom lens. In some embodiments, only one of the second lens group G2 and the fourth lens group G4 may be moved along the axis of the zoom lens to change the focal length of the zoom lens.

In some embodiments, materials of the lenses of the zoom lens may include glass, plastic (e.g., PC, PMMA, etc.), quartz, crystal, or the like, or any combination thereof. For example, all of the sixteen lenses may be made up of glass. As another example, all of the sixteen lenses may be made up of plastic. As still another example, one or some of the sixteen lenses may be made up of glass, and others of the sixteen lenses may be made up of plastic.

In some embodiments, a focal length of a certain lens (e.g., the a focal length $f_{42}$ of the twelfth lens L42, the focal length $f_{22}$ of the fifth lens L22, the focal length $f_{12}$ of the second lens L12, etc.) that satisfies a certain condition described above may improve imaging quality of an image produced by the zoom lens. In some embodiments, an Abbe number of a certain lens (e.g., the Abbe number $Vd_{51}$ of the fifteenth lens L51, the Abbe number $Vd_{23}$ of the sixth lens L23, the Abbe number $Vd_{11}$ of the first lens L11, etc.) that satisfies a certain condition described above may ensure that images captured at a wide temperature range are clear. Further, the Abbe number of a certain lens (e.g., the Abbe number $Vd_{51}$ of the fifteenth lens L51, the Abbe number $Vd_{23}$ of the sixth lens L23, the Abbe number $Vd_{11}$ of the first lens L11, etc.) that satisfies a certain condition described above may reduce chromatic aberrations of the images and improve imaging quality. In some embodiments, a refractive index a certain lens (e.g., the refractive index $Nd_{52}$ of the sixteenth lens L52, the refractive index $Nd_{41}$ of the eleventh lens L41 may satisfy: $Nd_{41} \leq 1.61$, the refractive index $Nd_{43}$ of the thirteenth lens L43, the refractive index $Nd_{21}$ of the fourth lens L21, etc.) that satisfies a certain condition described above may reduce a total length of the zoom lens, reduce spherical aberrations, and improve imaging quality.

In some embodiments, the zoom lens may include a plurality of parameters. For example, each surface of a lens in the zoom lens may have a radius of curvature R. As another example, a center thickness $T_c$ may refer as a distance between two center points of two adjacent surfaces in the zoom lens. As still another example, each lens in the zoom lens may have a refractive index nd and/or an Abbe number Vd. As still another example, an aspherical lens may have a conic constant k representing a quantity describing conic sections of the aspherical lens.

Merely by way of example, the radius of curvature R, the center thickness $T_c$, the refractive index nd, the Abbe number Vd of each lens of the zoom lens, and/or the conic constant k of each aspherical lens of the zoom lens may satisfy the conditions as shown in the following TAB. 1.

TABLE 1

| Surface Number | Radius of Curvature R (mm) | Center Thickness $T_c$ (mm) | Refractive Index nd | Abbe Number Vd | Conic Constant k |
|---|---|---|---|---|---|
| 1 | 148.29 | 2.00 | 1.95 | 18.0 | |
| 2 | 93.39 | 6.39 | 1.59 | 68.6 | |
| 3 | −285.15 | 0.15 | | | |
| 4 | 47.78 | 5.14 | 1.59 | 68.6 | |
| 5 | 110.07 | 3.28 | | | |
| 6 | 166.02 | 1.20 | 1.60 | 65.5 | |
| 7 | 20.73 | 6.49 | | | |
| 8 | −39.67 | 1.20 | 1.62 | 63.4 | |
| 9 | 31.28 | 3.00 | | | |
| 10 | 35.52 | 2.41 | 1.92 | 20.9 | |
| 11 | 86.53 | 35.72 | | | |
| STOP | Infinity | 2.56 | | | |
| 13 | −18.71 | 1.20 | 1.59 | 68.6 | |
| 14 | 110.98 | 3.18 | 1.92 | 20.9 | |
| 15 | −51.51 | 0.10 | | | |
| 16 | 55.03 | 5.59 | 1.59 | 68.6 | |
| 17 | −28.90 | 1.2 | 1.69 | 31.2 | |
| 18 | 53.06 | 4.81 | | | |
| 19 | 25.62 | 7.62 | 1.55 | 71.7 | −2.02 |
| 20 | −44.23 | 0.10 | | | 0.52 |
| 21 | 31.10 | 5.61 | 1.59 | 68.6 | |
| 22 | −62.98 | 1.20 | 1.65 | 33.8 | |
| 23 | 19.32 | 0.84 | | | |
| 24 | 15.89 | 6.22 | 1.50 | 81.6 | −1.10 |
| 25 | −49.48 | 0.80 | | | −29.28 |
| 26 | 375.08 | 1.20 | 1.75 | 25.0 | |
| 27 | 26.51 | 1.05 | | | |
| 28 | 34.36 | 2.14 | 1.95 | 18.0 | |
| 29 | 106.80 | 4.46 | | | |
| 30 | Infinity | 21.00 | 1.52 | 64.2 | |
| 31 | Infinity | 2.53 | | | |
| IMA | Infinity | | | | | wherein the surface number denotes a number of a surface of a lens in sequence from the object side to the image side. For example, as shown in FIGS. 1 and 2, the surface number 1 may refer to a surface of the first lens L11 facing the object side. As another example, the surface number 2 may refer to a cemented surface of the first lens L11 and the second lens L12. As still another example, the surface number STOP and IMA may refer to a surface of the aperture stop and the image plane, respectively.

In some embodiments, each lens in the zoom lens may be designed according to the parameters as shown in TAB. 1. Taking the first lens L11 for example, the radius of curvature R of the surface of the first lens L11 facing the object side (the surface number 1) is 148.29 mm, the refractive index nd of the surface number 1 is 1.95, and the Abbe number vd of the surface number 1 is 18.0. The radius of curvature R of the surface of the first lens L11 facing the image side (the surface number 2) is 93.39 mm, the refractive index nd of the surface number 2 is 1.59, and the Abbe number vd of the surface number 2 is 68.6. The center thickness $T_c$ between the surface of the first lens L11 facing the object side (the surface number 1) and the surface of the first lens L11 facing the image side (the surface number 2) is 2 mm.

It should be noted that the conditions in TAB. 1 are merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure.

As shown in FIGS. 1 and 2, the eleventh lens L41 and the fourteenth lens L44 may be aspherical lenses. The surface number 19 and the surface number 20, which are the two surfaces of the eleventh lens L41, are aspherical. The surface number 24 and the surface number 25, which are the two surfaces of the fourteenth lens L44, are aspherical. In some embodiments, a conic constant k of an aspherical lens may be determined according to Equation (5):

$$Z = \frac{cr^2}{1+\sqrt{1-(1+k)c^2r^2}} + Ar^4 + Br^6 + Cr^8 + Dr^{10} + Er^{12} + Fr^{14} + Gr^{16}, \quad (5)$$

where Z denotes an axial rise of arch of an aspherical surface, r denotes a height of the aspherical surface, c denotes a curvature of a fitted spherical surface, which has a value equal to a reciprocal of the radius of curvature R of the surface, the coefficients A-G denote the $4^{th}$, $6^{th}$, $8^{th}$, $10^{th}$, $12^{th}$, $14^{th}$, $16^{th}$ order coefficients of an aspheric polynomial, respectively.

In some embodiments, the coefficients A-G of the surfaces (the surface number 19 and the surface number 20) of the eleventh lens L41 and the surfaces (the surface number 24 and the surface number 25) of the fourteenth lens L44 may satisfy the conditions as shown in the following TAB. 2.

TABLE 2

| Surface Number | A | B | C | D | E | F |
|---|---|---|---|---|---|---|
| 19 | 7.426E−06 | −1.742E−08 | 6.450E−11 | −7.470E−14 | 0 | 0 |
| 20 | −8.412E−06 | 8.943E−08 | −3.383E−10 | 8.917E−13 | −1.089E−15 | 0 |
| 24 | −1.087E−05 | 1.095E−07 | −3.753E−10 | 8.379E−13 | 0 | 0 |
| 25 | −2.250E−05 | 1.200E−07 | −3.985E−10 | 1.017E−12 | 0 | 0 |

It should be noted that the parameters of the eleventh lens L41 and the fourteenth lens L44 are merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure.

According to the zoom lens described in the present disclosure, the total track length TTL of the zoom lens may satisfy TTL≤140.5 mm. The focal length f at the wide angle end (short focal length) may be 10 mm, and the focal length f at the telephoto end (long focal length) may be 50 mm. The field angle of the zoom lens at the wide angle end (short focal length) may be 62°, and the field angle of the zoom lens at the telephoto end (long focal length) may be 16°. The field angle of the zoom lens may be between 16° and 62°. The optical distortion of the zoom lens at the wide angle end (short focal length) may be −9%, and the optical distortion of the zoom lens at the telephoto end (long focal length) may be +2%. The aperture FNO of the zoom lens may satisfy FNO≤1.2. The size of the image plane of the zoom lens may be 1/1.2".

According to the zoom lens described in the present disclosure, the zoom lens may support a sensor that has a maximum 1/1.2" image plane. The total track length of the zoom lens does not exceed 141 mm. A modulation transfer function MTF of the zoom lens under a spatial frequency of 100 lp/mm exceeds 0.6. The maximum aperture FNO of the zoom lens is 1.2, which is suitable for monitoring requirements under low illumination conditions. The zoom lens may further have an infrared confocal function. In addition, there is a small count of lenses of the zoom lens, and the zoom lens is easy to be produced and the cost is low.

Figure 3:
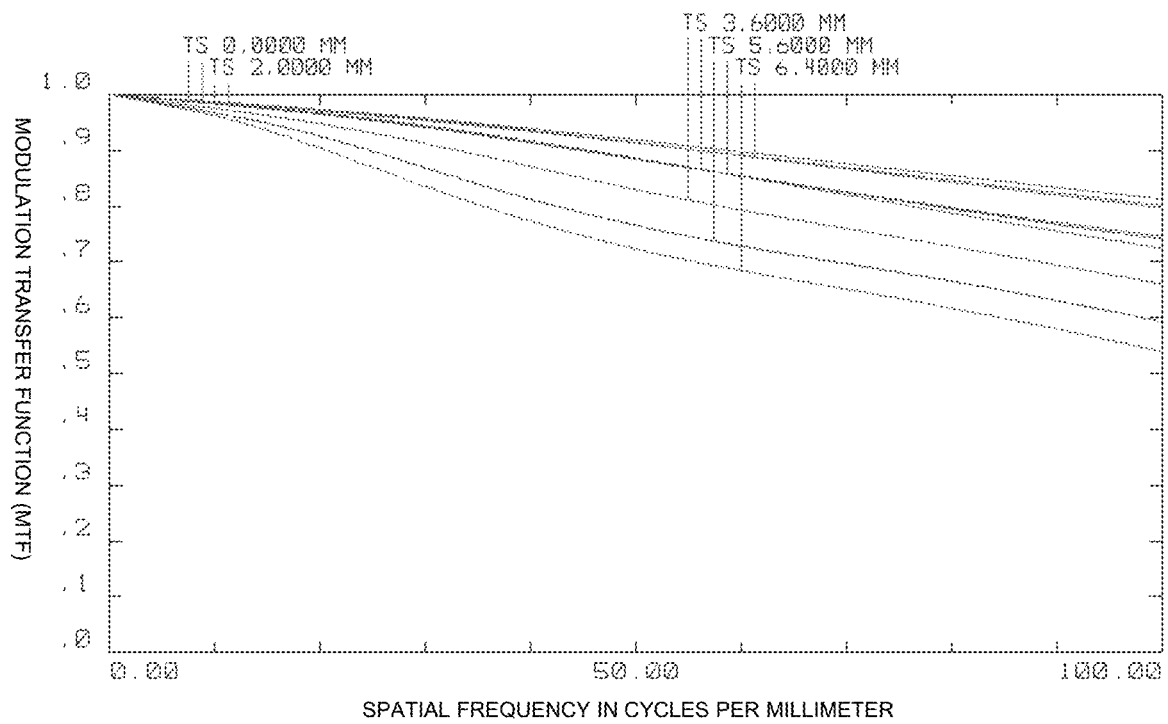
FIG. 3 illustrates exemplary modulation transfer functions (MTF) of a zoom lens at a wide angle end (short focal length) according to some embodiments of the present disclosure.

FIG. 3 illustrates exemplary modulation transfer functions (MTF) of a zoom lens at a wide angle end (short focal length) at room temperature in visible light according to some embodiments of the present disclosure. In some embodiments, the MTF may be used to evaluate imaging qualities of a zoom lens. For example, the higher and smoother of the curve of the MTF, the higher imaging quality of the zoom lens. The aberrations, such as a spherical aberration, a coma, an astigmatism, a field curvature, a lateral chromatic aberration, an axial chromatic aberration, etc., may be well-calibrated. As shown in FIG. 3, the curve of the MTF in visible light at the wide angle end (short focal length) of the zoom lens at room temperature is smooth and concentrated. The average value of the MTF of a full field (a half image height Y'=6.4 mm) may exceed 0.6, thereby satisfying high imaging requirements at the wide angle end (short focal length).

Figure 4:
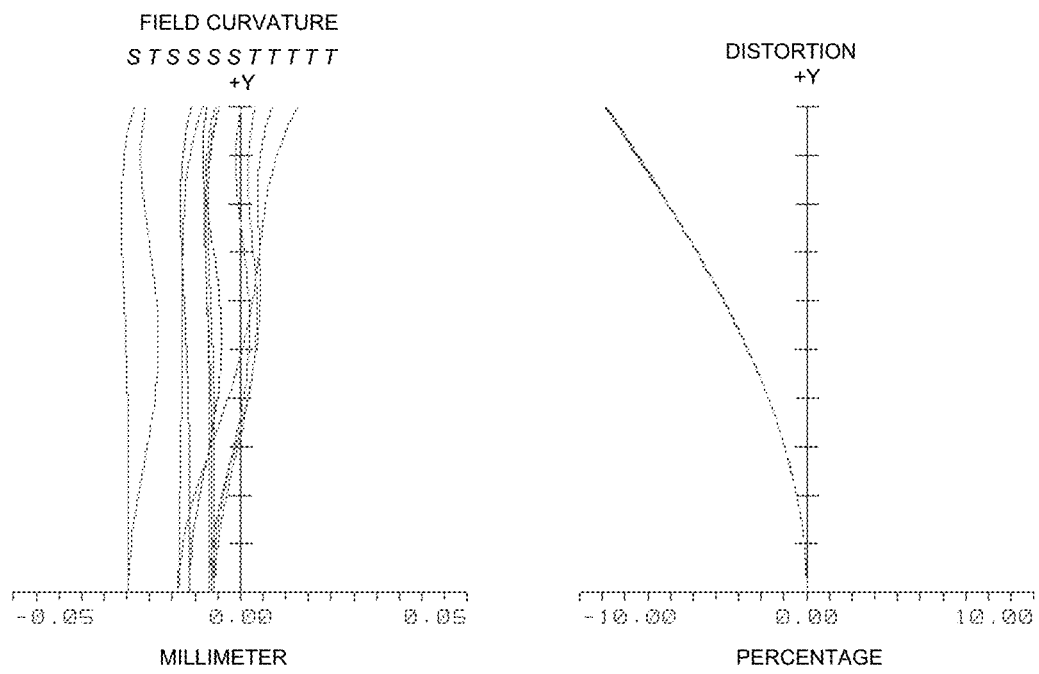
FIG. 4 illustrates exemplary field curvatures and exemplary distortions of a zoom lens at a wide angle end (short focal length) according to some embodiments of the present disclosure.

FIG. 4 illustrates exemplary field curvatures and exemplary distortions of a zoom lens at a wide angle end (short focal length) in visible light according to some embodiments of the present disclosure. In some embodiments, when a lens has a field curvature, an intersection of beams does not coincide with an ideal image point. Although the image point can be clearly identified at each specific point, the whole image plane is a curved surface. As shown in FIG. 4, "T" denotes a meridional field curvature, and "S" denotes an arc-sagittal field curvature. A field curve shows distances between a current focal plane (or a current image plane) and a paraxial focal plane as a function of field coordinates. The meridional field curves are measured from the current focal plane to the paraxial focal plane along the Z-axis at a meridional plane (the YZ plane). The arc-sagittal field curves show measured distances at a plane perpendicular to the meridional plane. As shown in FIG. 4, a baseline is on the optical axis of the zoom lens, and a top of a curve represents a maximum field of view (or a maximum angle or a maximum height). There is no unit on the vertical axis because the curve is normalized using a maximum radial field of view. As shown in FIG. 4, the values of the meridional field curvatures at the wide angle end (short focal length) are within ±0.05 mm.

In some embodiments, distortions of a zoom lens are general inherent perspective distortions of the zoom lens. The distortions are caused by the perspective distortions, which are bad for the image quality of an image captured by the zoom lens since the purpose of photography is to reproduce rather than to exaggerate. Thus, the distortions cannot be eliminated but only be improved. As shown in FIG. 4, the distortions of the zoom lens at the wide angle end (short focal length) are well controlled within −0.2%. Further as shown in FIG. 4, the curves representing the distortions of the zoom lens at a plurality of wavelengths (e.g., 0.436 mm, 0.486 mm, 0.546 mm, 0.587 mm, and 0.656 mm) coincide with each other.

Figure 5:
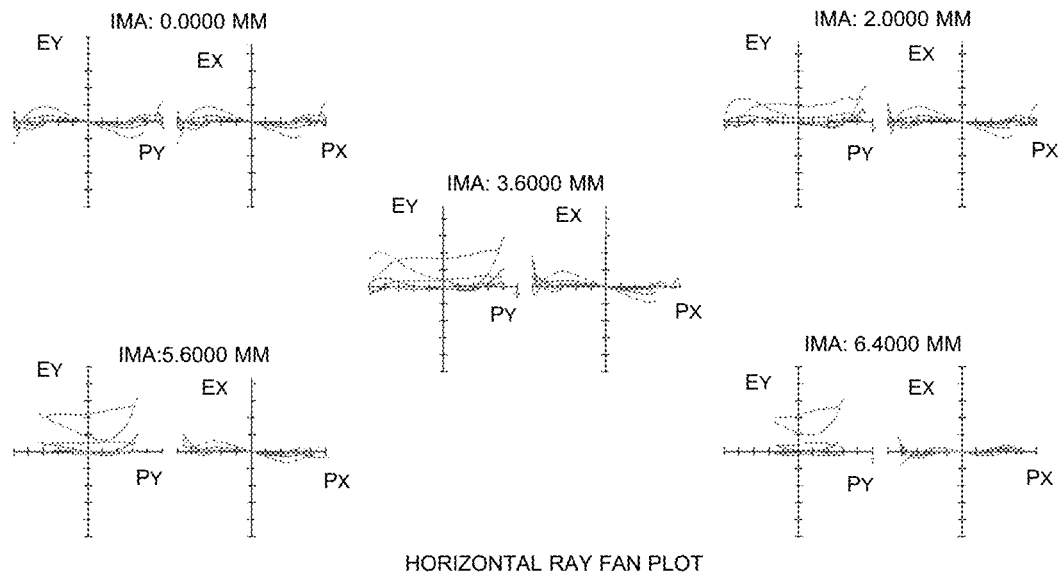
FIG. 5 illustrates exemplary horizontal ray fan plots of a zoom lens at a wide angle end (short focal length) according to some embodiments of the present disclosure.

FIG. 5 illustrates exemplary horizontal ray fan plots of a zoom lens at a wide angle end (short focal length) in visible light according to some embodiments of the present disclosure. As shown in FIG. 5, the fan plots are concentrated, the spherical aberration and the astigmatism of the zoom lens are well controlled.

Figure 6:
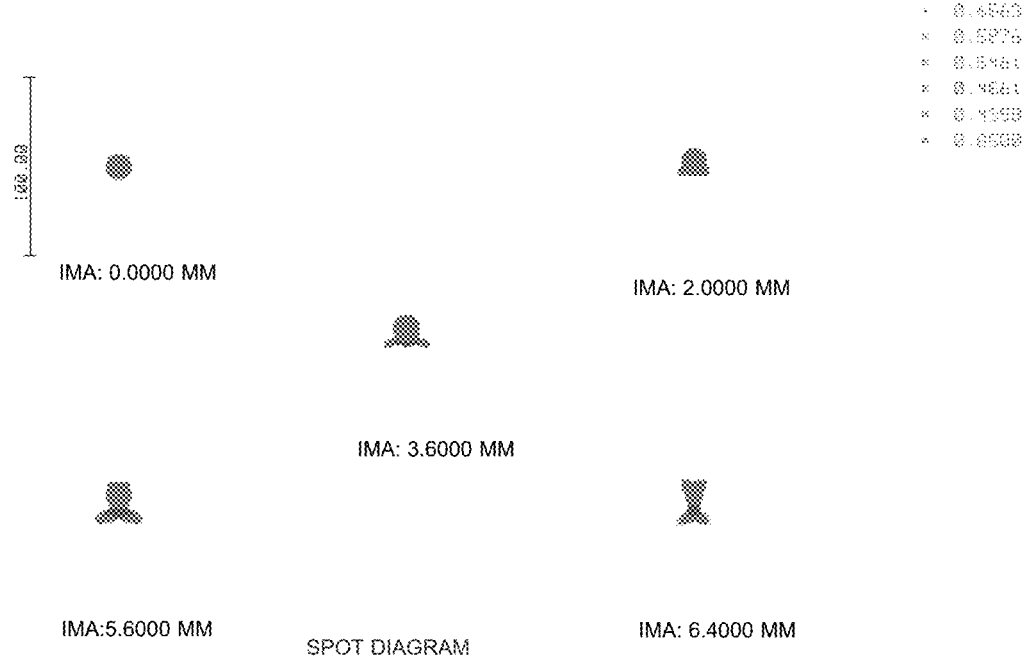
FIG. 6 illustrates an exemplary spot diagram of a zoom lens at a wide angle end (short focal length) according to some embodiments of the present disclosure.

FIG. 6 illustrates an exemplary spot diagram of a zoom lens at a wide angle end (short focal length) in visible light according to some embodiments of the present disclosure. As shown in FIG. 6, a spot radius of the zoom lens is small and concentrated, and the aberration and the coma are well controlled. Moreover, the small spot radius is achieved even at the wavelength of 0.850 mm, which indicates that the zoom lens has good performance in white light and infrared confocal.

Figure 7:
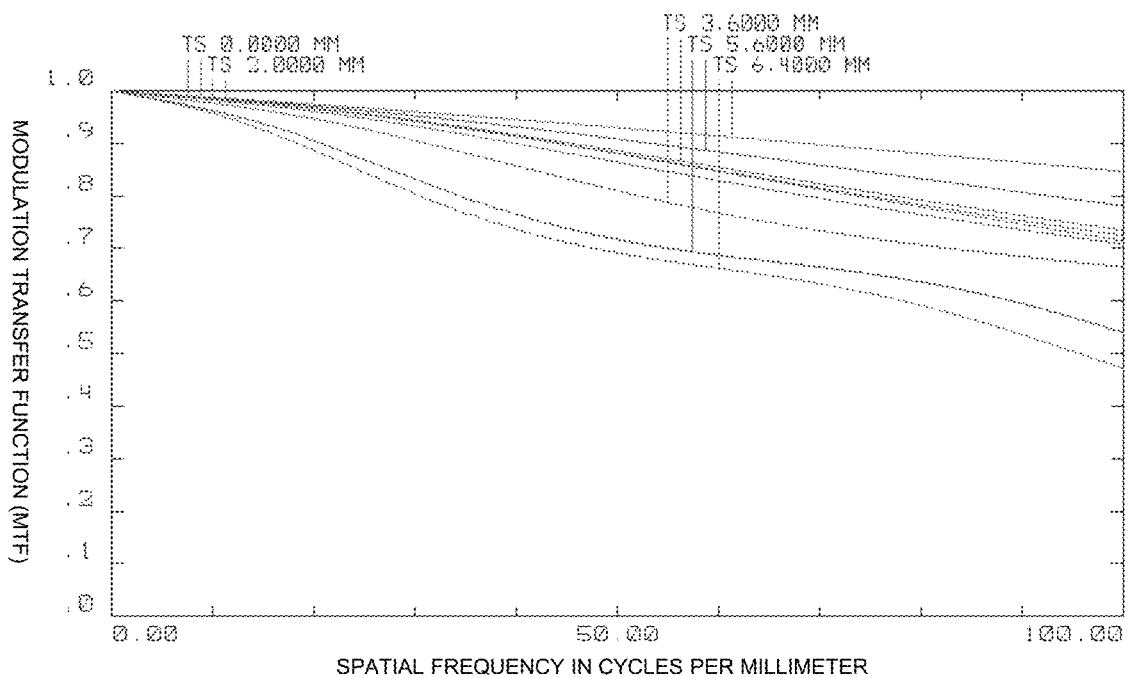
FIG. 7 illustrates exemplary modulation transfer functions (MTF) of a zoom lens at a telephoto end (long focal length) according to some embodiments of the present disclosure.

FIG. 7 illustrates exemplary modulation transfer functions (MTF) of a zoom lens at a telephoto end (long focal length) at room temperature in visible light according to some embodiments of the present disclosure. As shown in FIG. 7, the curve of the MTF in visible light at the telephoto end (long focal length) of the zoom lens at room temperature is smooth and concentrated. The average value of the MTF of a full field (a half image height Y'=6.4 mm) may exceed 0.6, thereby satisfying high imaging requirements at the telephoto end (long focal length).

Figure 8:
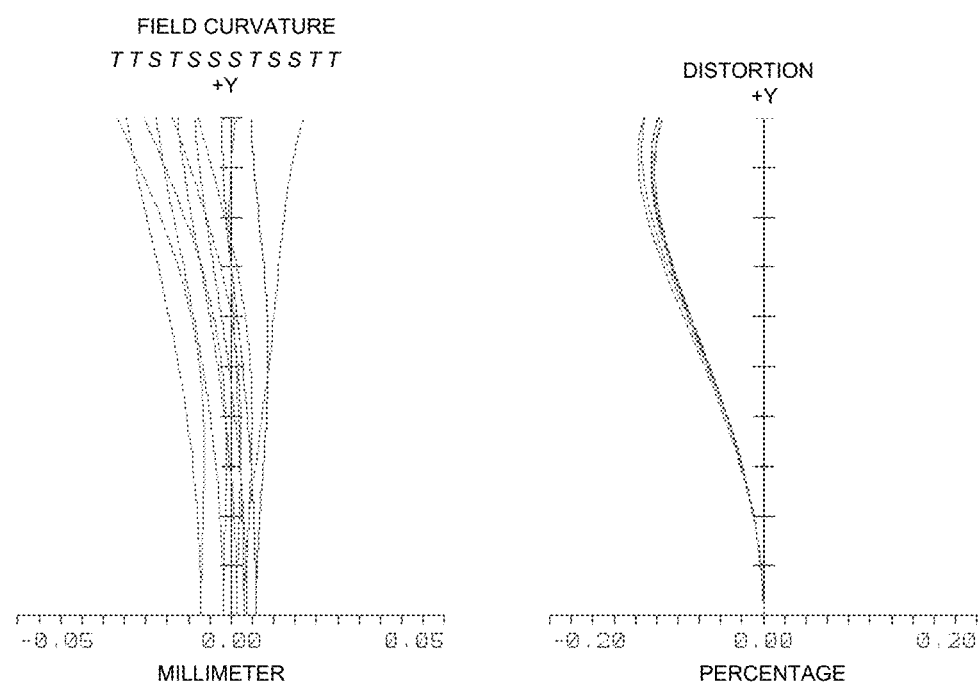
FIG. 8 illustrates exemplary field curvatures and exemplary distortions of a zoom lens at a telephoto end (long focal length) according to some embodiments of the present disclosure.

FIG. 8 illustrates exemplary field curvatures and exemplary distortions of a zoom lens at a telephoto end (long focal length) according to some embodiments of the present disclosure. As shown in FIG. 8, "T" denotes a meridional field curvature, and "S" denotes an arc-sagittal field curvature. As shown in FIG. 8, the distortions of the zoom lens at the telephoto end (long focal length) are well controlled within −9.0%. According to the distortions of the zoom lens at the telephoto end (long focal length) as shown in FIG. 8 and the distortions of the zoom lens at the wide angle end (short focal length) as shown in FIG. 4, the focal length, the field of view, and the size of the image plane of the zoom lens are balanced. A deformation caused by the distortions may be corrected by image processing.

Figure 9:
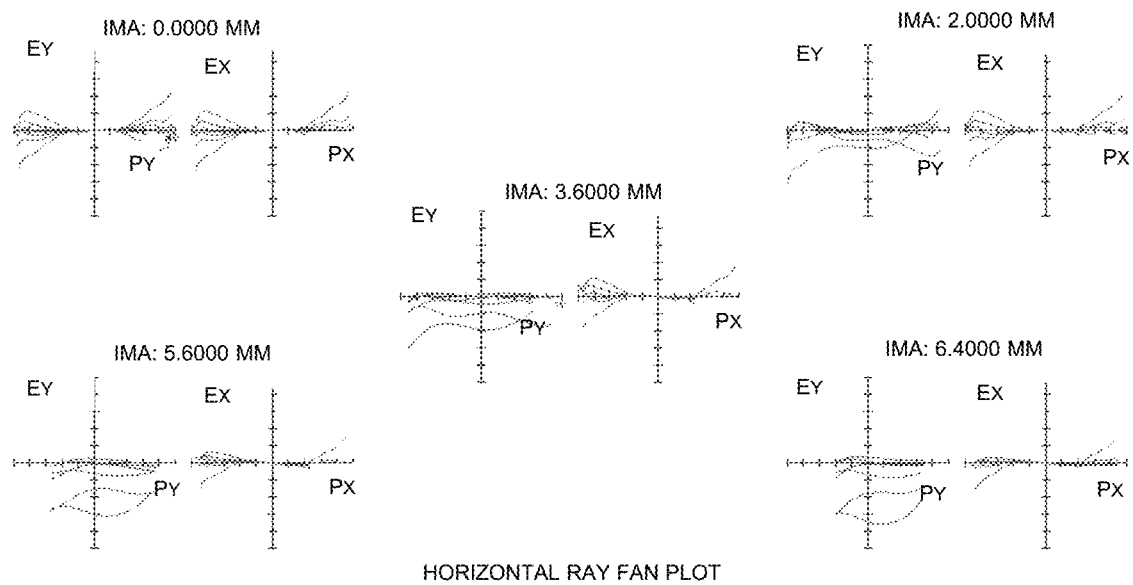
FIG. 9 illustrates exemplary horizontal ray fan plots of a zoom lens at a telephoto end (long focal length) according to some embodiments of the present disclosure.

FIG. 9 illustrates exemplary horizontal ray fan plots of a zoom lens at a telephoto end (long focal length) according to some embodiments of the present disclosure. As shown in FIG. 9, the fan plots are concentrated, the spherical aberration and the astigmatism of the zoom lens may be well controlled.

Figure 10:
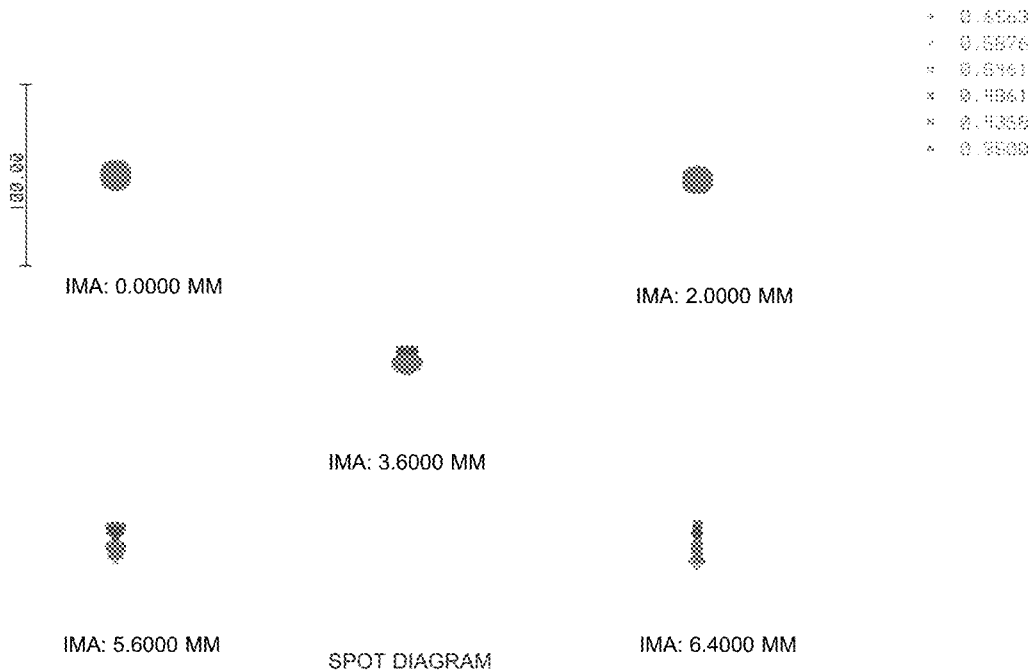
FIG. 10 illustrates an exemplary spot diagram of a zoom lens at a telephoto end (long focal length) according to some embodiments of the present disclosure.

FIG. 10 illustrates an exemplary spot diagram of a zoom lens at a telephoto end (long focal length) according to some embodiments of the present disclosure. As shown in FIG. 10, a spot radius of the zoom lens is small and concentrated, and the aberration and the coma are well controlled. Moreover, the small spot radius is achieved even at the wavelength of 0.850 mm, which indicates that the zoom lens has good performance in white light and infrared confocal.

According to the present disclosure, sixteen lenses, each of which has a specific structure and a specific focal power, are arranged in a specific order from the object side to the image side, respectively. According to the combination of the sixteen lenses, a zoom lens with a large image plane, a high resolution, a high imaging quality, a small size, and an infrared confocal function is provided. According to the zoom lens of the present disclosure, distortions are well controlled and the imaging performance thereof is excellent.

In some embodiments, another aspect of the present disclosure relates to optical apparatuses having the zoom lenses described in the present disclosure. For example, an optical apparatus may include a zoom lens according to the present disclosure and an image pickup device. In some embodiments, the image pickup device may be at the image plane of the zoom lens. In some embodiments, the zoom lens may guide light from an object at the object side of the zoom lens to the image pickup device. In some embodiments, the image pickup device may convert an object image into electrical signals. For example, the image pickup device may include a CCD sensor, a CMOS sensor, or the like, or any combination thereof.

In some embodiments, the optical apparatus may be any electronic device that is capable of capturing images or videos. For example, the optical apparatus may include an image sensor, a video recorder, or the like, or any combination thereof. In some embodiments, the optical apparatus may include any suitable types of camera, such as a fixed camera, a fixed dome camera, a covert camera, a Pan-Tilt-Zoom (PTZ) camera, a thermal camera, or the like, or any combination thereof. In some embodiments, the optical apparatus may be implemented on a computing device or a mobile device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A zoom lens comprising, in order from an object side to an image side:
a first lens group;
a second lens group;
a third lens group;
a fourth lens group, wherein the fourth lens group includes, in order from the object side to the image side:
a first lens having a positive focal power;
a second lens having a positive focal power;
a third lens having a negative focal power;
a fourth lens having a positive focal power; and
a fifth lens group; wherein the zoom lens satisfies the following conditions:

$$-5.6 \leq \frac{f_2}{f_w} \times \tan(FOV_w) \leq -2.1,$$

$$0.05 \leq \frac{f_4}{f_T} \times \tan(FOV_T) \leq 0.2,$$

$$3.9 \leq \frac{\sqrt{f_w \times f_T}}{TTL} \times BFL \leq 5.2, \text{ and}$$

$$\frac{BFL}{TL} \leq 0.35,$$

wherein $f_2$ denotes a focal length of the second lens group, $f_4$ denotes a focal length of the fourth lens group, $f_w$ denotes a focal length of the zoom lens at a wide angle end, $FOV_w$ denotes a field of view of the zoom lens at the wide angle end, $f_T$ denotes a focal length of the zoom lens at a telephoto end, $FOV_T$ denotes a field of view of the zoom lens at the telephoto end, TTL denotes a total track length of the zoom lens, BFL denotes a back focal length of the zoom lens, and TL denotes a total length of the zoom lens.

2. The zoom lens of claim 1, wherein the first lens group includes, in order from the object side to the image side:
a fifth lens having a negative focal power;
a sixth lens having a positive focal power; and
a seventh lens having a positive focal power lens.

3. The zoom lens of claim 2, wherein the fifth lens is cemented with the sixth lens to form a cemented doublet.

4. The zoom lens of claim 1, wherein the second lens group includes, in order from the object side to the image side:
an eighth lens having a negative focal power;
a ninth lens having a negative focal power; and
a tenth lens having a positive focal power.

5. The zoom lens of claim 4, wherein a radius of curvature R8 of a surface of the eighth lens facing the image side and a radius of curvature R9 of a surface of the ninth lens facing the object side satisfies:

$$\frac{(R8 - R9)}{(R8 + R9)} \leq -2.3.$$

6. The zoom lens of claim 1, wherein the third lens group includes, in order from the object side to the image side:
an eleventh lens having a negative focal power;
twelfth lens having a positive focal power;
thirteenth lens having a positive focal power; and
a fourteenth lens having a negative focal power lens.

7. The zoom lens of claim 6, wherein the eleventh lens is cemented with the twelfth lens to form a cemented doublet.

8. The zoom lens of claim 6, wherein the thirteenth lens is cemented with the fourteenth lens to form a cemented doublet.

9. The zoom lens of claim 1, wherein the second lens is cemented with the third lens to form a cemented doublet.

10. The zoom lens of claim 1, wherein the first lens includes a biconvex lens, and the biconvex lens is an aspherical lens.

11. The zoom lens of claim 1, wherein the second lens includes a biconvex lens.

12. The zoom lens of claim 1, wherein the third lens includes a biconcave lens, wherein a radius of curvature of a surface of the second lens facing the image side equals a radius of curvature of a surface of the third lens facing the object side.

13. The zoom lens of claim 1, wherein the fourth lens includes a biconvex lens, and the biconvex lens is an aspherical lens.

14. The zoom lens of claim 1, wherein the fifth lens group includes, in order from the object side to the image side:
   a fifteenth lens having a negative focal power, and
   a sixteenth lens having a positive focal power.

15. The zoom lens of claim 14, wherein the fifteenth lens includes a meniscus lens, and a surface of the meniscus lens facing the object side is convex.

16. The zoom lens of claim 14, wherein the sixteenth lens includes a meniscus lens, and a surface of the meniscus lens facing the object side is convex.

17. The zoom lens of claim 1, further comprising an aperture stop between the second lens group and the third lens group.

18. The zoom lens of claim 1, further comprising an optical filter between the fifth lens group and an image plane of the zoom lens.

* * * * *